United States Patent
Wang et al.

(10) Patent No.: US 12,142,755 B2
(45) Date of Patent: Nov. 12, 2024

(54) MANUFACTURING METHOD OF CARBON-COATED LITHIUM IRON PHOSPHATE MATERIAL

(71) Applicant: Advanced Lithium Electrochemistry Co., Ltd., Taoyuan (TW)

(72) Inventors: Ya-Hui Wang, Taoyuan (TW); Feng-Yen Tsai, Taoyuan (TW)

(73) Assignee: Advanced Lithium Electrochemistry Co., Ltd., Taoyuan (TW)

(*) Notice: Subject to any disclaimer, the term of this patent is extended or adjusted under 35 U.S.C. 154(b) by 0 days.

(21) Appl. No.: 18/227,921

(22) Filed: Jul. 29, 2023

(65) Prior Publication Data
US 2024/0234697 A1 Jul. 11, 2024

(30) Foreign Application Priority Data
Jan. 11, 2023 (TW) ................... 112101114

(51) Int. Cl.
| | |
|---|---|
| H01M 4/36 | (2006.01) |
| C01B 25/45 | (2006.01) |
| H01M 4/58 | (2010.01) |
| H01M 4/587 | (2010.01) |

(52) U.S. Cl.
CPC ............. H01M 4/366 (2013.01); C01B 25/45 (2013.01); H01M 4/5825 (2013.01); H01M 4/587 (2013.01)

(58) Field of Classification Search
CPC ....... C01B 25/45; H01M 4/366; H01M 4/583; H01M 4/625; H01M 4/5825
USPC ................ 252/506; 429/221, 231.8
See application file for complete search history.

(56) References Cited

U.S. PATENT DOCUMENTS

2014/0147586 A1* 5/2014 Liang .................. H01M 4/5825
252/182.1

FOREIGN PATENT DOCUMENTS

| CN | 102854085 A | * | 1/2013 | |
|---|---|---|---|---|
| CN | 103730657 A | | 4/2014 | |
| CN | 103811754 B | | 1/2016 | |
| CN | 112751003 A | | 5/2021 | |
| CN | 113097455 A | * | 7/2021 | ........ H01M 10/0525 |
| CN | 114242980 A | | 3/2022 | |
| CN | 114335478 A | | 4/2022 | |
| CN | 114824546 A | | 7/2022 | |
| CN | 114843507 A | | 8/2022 | |
| CN | 115312903 A | | 11/2022 | |

* cited by examiner

*Primary Examiner* — Tri V Nguyen
(74) *Attorney, Agent, or Firm* — KIRTON McCONKIE; Evan R. Witt

(57) ABSTRACT

A manufacturing method of a carbon-coated lithium iron phosphate material including steps of: (a) providing a first slurry, a lithium source, and a first carbon source having a first weight, wherein the first slurry is formed from an iron source and a phosphorus source, and the first weight is equal to an input value; (b) mixing and grinding the first carbon source, the lithium source and the first slurry to form a second slurry; (c) performing a carbon content analysis on the second slurry to obtain a loss value, wherein the loss value is smaller than the input value and greater than zero; (d) adding a second carbon source having a second weight into the second slurry to form a third slurry, wherein the second weight is equal to the loss value; (e) drying and sintering the third slurry to form the carbon-coated lithium iron phosphate material.

11 Claims, 2 Drawing Sheets

MANUFACTURING METHOD OF CARBON-COATED LITHIUM IRON PHOSPHATE MATERIAL

CROSS-REFERENCE TO RELATED APPLICATION

This application claims priority to Taiwan Patent Application No. 112101114, filed on Jan. 11, 2023. The entire contents of the above-mentioned patent application are incorporated herein by reference for all purposes.

FIELD OF THE INVENTION

The present disclosure relates to a manufacturing method of a carbon-coated lithium iron phosphate material, and more particularly to a manufacturing method of a carbon-coated lithium iron phosphate material including rapid carbon content detection in a slurry.

BACKGROUND OF THE INVENTION

Lithium-ion batteries are widely used in the field of energy storage due to their excellent cycling performance and high energy density. Among the various types of lithium-ion batteries, those that utilize the lithium iron phosphate (LiFePO$_4$) as the positive electrode material offer advantages such as low material cost and high safety, making them a highly promising type. However, the olivine structure of the lithium iron phosphate leads to lower lithium-ion diffusion rate and electronic conductivity, thereby restricting the application of the lithium iron phosphate.

To overcome the mentioned limitations, the industry has adopted the carbon coating process to enhance the performance of lithium iron phosphate. However, in the conventional carbon coating process, the alkaline nature of the lithium-containing slurry and the temperature rise during the grinding process lead to oxidation and decomposition of the carbon source in the alkaline and high-temperature environment. As a result, the traditional carbon coating process yields a carbon-coated lithium iron phosphate material with uncertain carbon content. In response, the conventional carbon coating process also includes a carbon content analysis through combustion to ensure that the carbon-coated lithium iron phosphate material meets a target specification of carbon content. However, if the detected result does not meet the specification of carbon content, the unsatisfactory carbon-coated lithium iron phosphate material formed by sintering cannot be adjusted to achieve the target specification of the carbon content. Instead, it must be discarded, and a new manufacturing process starts with fresh raw materials. Therefore, the product quality of the conventional carbon coating process is unstable, leading to increased costs and wasted time.

In view of the above, there is a need to provide a manufacturing method of a carbon-coated lithium iron phosphate material including rapid carbon content detection in slurry, thereby reducing the costs and the wasted time and further ensuring the stability of the product quality.

SUMMARY OF THE INVENTION

An object of the present disclosure is to provide a manufacturing method of a carbon-coated lithium iron phosphate material including rapid carbon content detection in slurry, thereby reducing the costs and the wasted time and further ensuring the stability of the product quality. First, a first slurry, a first carbon source and a lithium source are mixed to form a second slurry. The first slurry is formed from a metal source and a phosphorus source. The first carbon source is a water-soluble carbohydrate having a first weight. The first weight equals to an input value. Next, a sample is taken from the second slurry, and a carbon content analysis is performed on the sample to obtain a loss value. The carbon content analysis is performed by a brix meter. After that, a second carbon source is added into the second slurry to form a third slurry. The second carbon source is a water-soluble carbohydrate having a second weight. The second weight equals to the loss value. Finally, the third slurry is dried and sintered to form the carbon-coated lithium iron phosphate material. Performing the carbon content analysis on the slurry before drying and sintering provides the feasibility to add the second carbon source based on the obtained loss value, particularly when the target specification of the carbon content is not met. As a result, the additional costs and the wasted time due to reproduction are reduced, and the stability of product quality is ensured. Compared to the traditional carbon content analysis through combustion, the brix meter is not only suitable for analyzing the carbon content in liquid but also enables rapid detection, thereby reducing the time from sampling to obtaining the test results. The time reduction leads to the minimization of the decrease in carbon content due to the oxidation and decomposition of the carbon source.

In accordance with an aspect of the present disclosure, a manufacturing method of a carbon-coated lithium iron phosphate material is provided. The manufacturing method of the carbon-coated lithium iron phosphate material includes: (a) providing a first slurry, a lithium source, and a first carbon source having a first weight, wherein the first slurry is formed from an iron source and a phosphorus source, wherein the lithium source, the iron source and the phosphorus source are configured to form a core layer of the carbon-coated lithium iron phosphate material, and the first weight is equal to an input value; (b) mixing and grinding the first carbon source, the lithium source and the first slurry to form a second slurry; (c) performing a carbon content analysis on the second slurry to obtain a loss value, wherein the loss value is smaller than the input value and greater than zero; (d) adding a second carbon source having a second weight into the second slurry to form a third slurry, wherein the second weight is equal to the loss value; (e) drying and sintering the third slurry to form the carbon-coated lithium iron phosphate material, wherein the carbon-coated lithium iron phosphate material comprises the core layer and a carbon coating layer coated on the core layer, wherein the core layer is formed from the lithium source, the iron source and the phosphorus source, and the carbon coating layer is formed from the first carbon source and the second carbon source.

In an embodiment, the first carbon includes a water-soluble carbohydrate.

In an embodiment, the carbon content analysis is performed by a brix meter.

In an embodiment, the carbon content analysis is performed on a sample to obtain the loss value, and the sample is taken from the second slurry.

In an embodiment, the sample comprises a flocculant.

In an embodiment, the carbon source, the lithium source and the first slurry are ground by a ball milling method.

In an embodiment, the third slurry is dried by a spray drying method.

In an embodiment, the third slurry is sintered in a non-oxidizing atmosphere.

In an embodiment, the third slurry is sintered at a sintering temperature ranged from 550° C. to 750° C.

In an embodiment, the carbon-coated lithium iron phosphate material has a third weight and a carbon content percentage. A target value is divided by the third weight to obtain the carbon content percentage. The target value falls between 40% of the input value and 70% of the input value.

In an embodiment, the carbon content percentage is ranged from 1.0% to 1.6%.

In an embodiment, the loss value is less than or equal to 30% of the input value.

DETAILED DESCRIPTION OF THE PREFERRED EMBODIMENT

Figure 1:
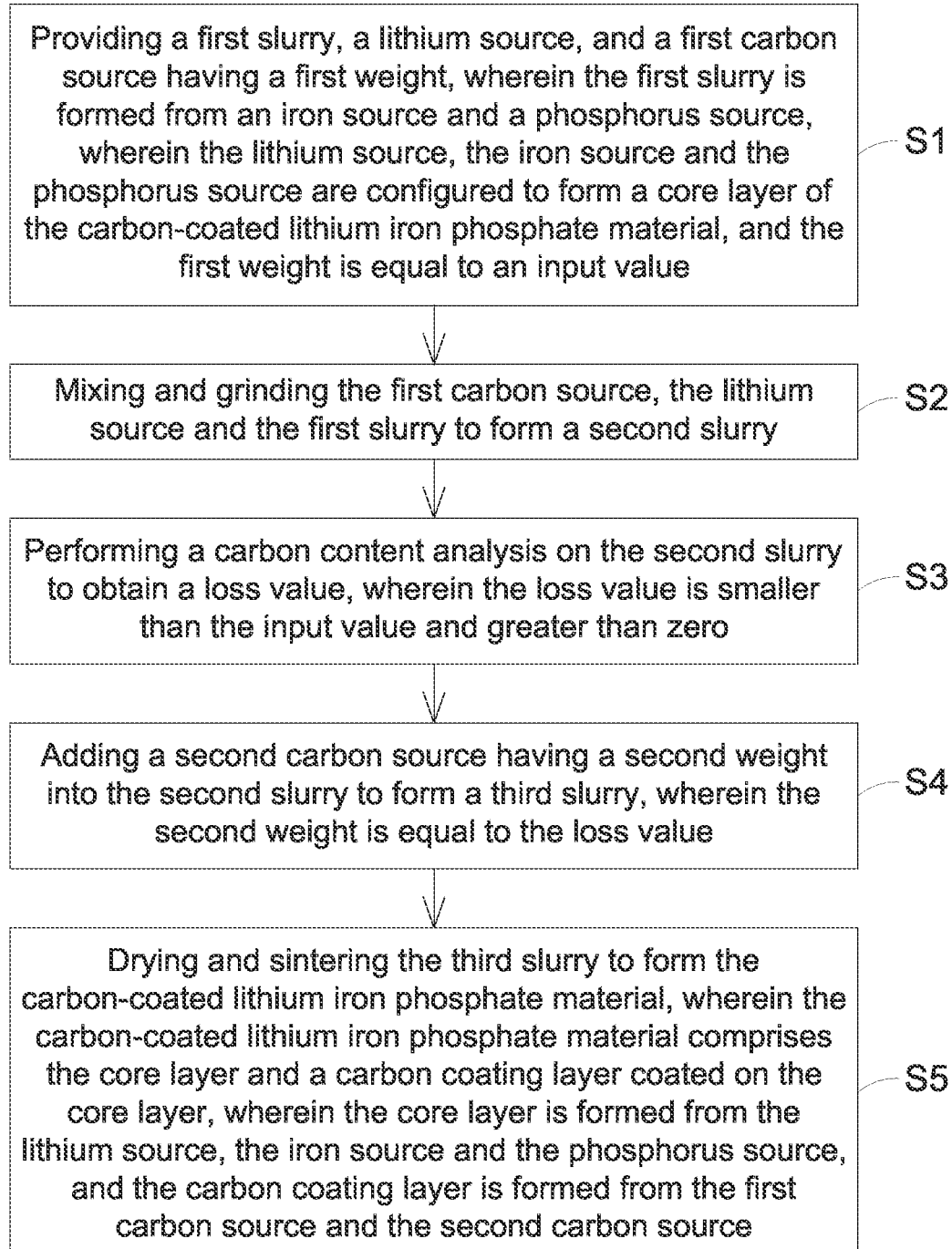
FIG. 1 is a flow chart of a manufacturing method of a carbon-coated lithium iron phosphate material according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Alternatively, the word "about" means within an acceptable standard error of ordinary skill in the art-recognized average. In addition to the operation/working examples, or unless otherwise specifically stated, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 2:
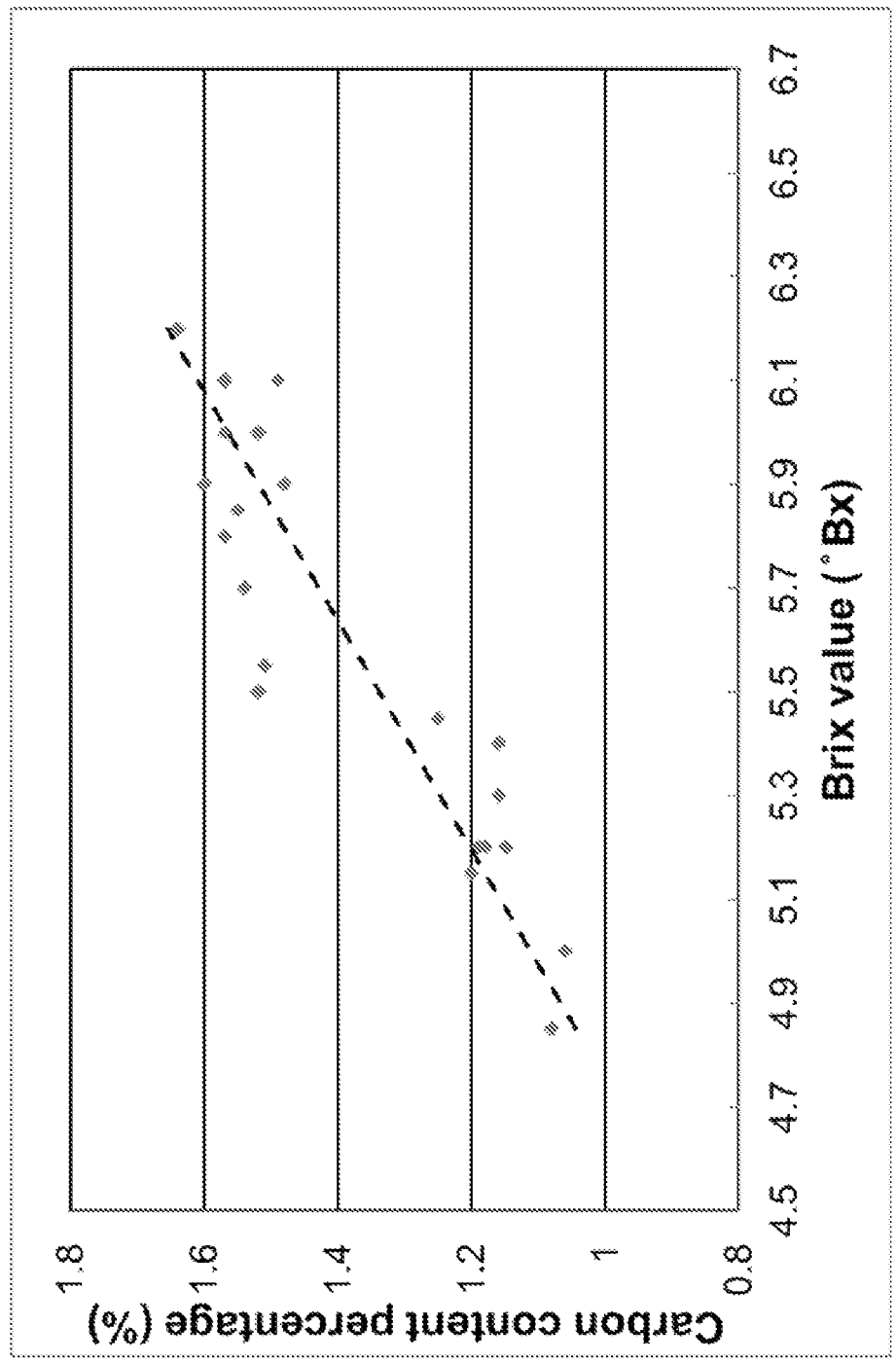
FIG. 2 is a scatter plot illustrating the relationship between Brix value and carbon content percentage according to an embodiment of the present disclosure.

Refer to FIGS. 1 to 2. FIG. 1 is a flow chart of a manufacturing method of a carbon-coated lithium iron phosphate material according to an embodiment of the present disclosure. FIG. 2 is a scatter plot illustrating the relationship between Brix value and carbon content percentage according to an embodiment of the present disclosure. In the embodiment, the manufacturing method of the carbon-coated lithium iron phosphate material includes following steps. First, as shown in the step S1, a first slurry, a lithium source and a first carbon source are provided. The first carbon source has a first weight, and the first slurry is formed from an iron source and a phosphorus source. The lithium source, the iron source and the phosphorus source are configured to form a core layer of the carbon-coated lithium iron phosphate material. The first weight equals to an input value. In the embodiment, the iron source is an iron powder, the phosphorus source is a phosphoric acid ($H_3PO_4$), and the iron powder and a phosphoric acid solution are reacted to form the first slurry. The reaction time is ranged from 17 hours to 24 hours, so as to form a more stable first slurry. Preferably but not exclusively, the carbon source is a water-soluble carbohydrate, including but not limited to a glucose, a fructose, a galactose, a sucrose, a maltose, or a lactose. The lithium source is a lithium salt, including but not limited to a lithium hydroxide (LiOH), a lithium carbonate ($Li_2CO_3$), a lithium nitrate ($LiNO_3$), or a lithium chloride (LiCl). In other embodiments, the lithium source is a combination of multiple different lithium salts. The present disclosure is not limited thereto. In the embodiment, a target value is defined as a desired carbon weight in the carbon-coated lithium iron phosphate material, and is obtained by calculating target specifications for the carbon-coated lithium iron phosphate material. The target specifications include a desired weight and a carbon content percentage for the carbon-coated lithium iron phosphate material. In the embodiment, the target value falls between 40% of the input value and 70% of the input value. The percentage of the target value relative to the input value is obtained according to the specific sintering process employed. Preferably but not exclusively, the target value is 50% of the input value. In the embodiment, the manufacturing method of the carbon-coated lithium iron phosphate material is designed to meet target specifications and a target value. The target specifications include a desired weight of 1000 grams and a carbon content percentage of 1.0% for the carbon-coated lithium iron phosphate material. The target value is 50% of the input value. Based on the provided data and calculations, a target value of 10 grams, an input value of 20 grams and a first weight of 20 grams is obtained.

Next, as shown in the step S2, the first carbon source, the lithium source and the first slurry are mixed and ground to form a second slurry. In the embodiment, the first carbon source, the lithium source and the first slurry are ground by a ball milling method for 9 to 12 hours to form the second slurry. The second slurry has a median particle size (D50) of 1.0 μm. Notably, the grinding conditions and the median particle size (D50) of the third slurry are not limited thereto, and are adjustable according to the specific requirements or needs. Additionally, it is emphasized that the addition of the first carbon source having the first weight in the step S1, followed by the mixing and grinding of the first carbon source, lithium source, and first slurry in the step S2, facilitates the homogeneous distribution of the first carbon source among the precursor materials of the lithium iron phosphate material.

After that, as shown in the step S3, a carbon content analysis is performed on the second slurry to obtain a loss value. The loss value is less than the input value and greater than zero. Preferably but not exclusively, the loss value is less than or equal to 30% of the input value. In the embodiment, the carbon content analysis is performed by sampling the second slurry to obtain a sample and analyzing the sample by a brix meter to obtain a Brix value. In other embodiments, the sample is clarified with a flocculant. The relationship between the Brix value of the second slurry and the carbon content percentage of the carbon-coated lithium iron phosphate material is shown in FIG. 2. By performing a regression analysis on the data of the Brix values and the corresponding carbon content percentages, the following regression line equation (1) is obtained:

$$y=0.4523x-1.1487 \tag{1}$$

In the regression line equation (1), "x" represents the Brix value (° Bx), and "y" represents the predicted carbon content percentage (%) based on the Brix value "x". The coefficient of determination ($R^2$) between the Brix value and the carbon content percentage is calculated to be 0.8311. The correlation coefficient (R) between the Brix value and the carbon content percentage is calculated to be 0.9117. There is a strong positive correlation between the Brix value of the second slurry and the carbon content percentage of the carbon-coated lithium iron phosphate material. In the embodiment, the loss value is defined as the weight of the first carbon source that is lost due to the oxidation and decomposition during the previous processes. In other words, the loss value represents the difference between the input value and the weight of carbon contained in the second slurry. Preferably but not exclusively, the weight of carbon contained in the second slurry is obtained through the calculations using the data of the weight of the carbon-coated lithium iron phosphate material, the Brix value of the sample taken from the second slurry, and the percentage of the target value relative to the input value. In the embodiment, the manufacturing method of the carbon-coated lithium iron phosphate material is designed to meet the target specifications, the target value and the input value. The target specifications include a desired weight of 1000 grams and a carbon content percentage of 1.0% for the carbon-coated lithium iron phosphate material. The target value is 10 grams, and the input value is 20 grams. A Brix value of 4.53° Bx is obtained by performing carbon content analysis on the sample taken from the second slurry. By applying the regression line equation (1) and substituting the obtained the Brix value of 4.53° Bx, a predicted carbon content percentage of 0.9% is calculated for the lithium iron phosphate material formed from the second slurry material. Additionally, by calculating the desired weight of the carbon-coated lithium iron phosphate material (1000 grams) and the percentage of the target value relative to the input value (50%), the weight of carbon contained in the second slurry of 18 grams is obtained. Subtracting the weight of carbon contained in the second slurry material (18 grams) from the input value of 20 grams, the loss value of 2 grams is obtained. Notably, the method used for converting the Brix value and the carbon content percentages is not restricted to the previously mentioned regression line equation (1). The method is flexible and may be optimized based on additional data or alternative statistical analysis methods. Preferably but not exclusively, the Brix meter has a resolution of 0.04° Bx. As a result, the loss value obtained through calculations has a resolution of 0.02%. With the resolution of 0.02%, the weight of the first carbon source that is lost due to the oxidation and decomposition during the previous processes is detected efficiently and accurately. Certainly, the present disclosure is not limited thereto.

Subsequently, as shown in the step S4, a second carbon source is added into the second slurry to form a third slurry. The second carbon source has a second weight, and the second weight equals to the loss value. Preferably but not exclusively, the loss value is less than or equal to 30% of the input value. In case of that the loss value is higher, it necessitates the addition of a larger quantity of the second carbon source into the second slurry during step S4. Moreover, an extended mixing time is required to achieve the uniform dispersion of a large quantity of the second carbon source in the second slurry and form the third slurry. However, the extended mixing time results in the additional oxidation and decomposition of the second carbon source. Preferably but not exclusively, in case of that the loss value is less than or equal to 30% of the input value, there is no need for excessively extended mixing time to achieve the uniform dispersion of the second carbon source in the second slurry and form the third slurry. In an embodiment, a loss value of 0.5 grams is obtained. Accordingly, a second carbon source having a second weight of 0.5 grams is added into the second slurry and mixed. Performing the carbon content analysis on the slurry before drying and sintering provides the feasibility to add the second carbon source based on the obtained loss value, particularly when the target specification of the carbon content is not met. As a result, the additional costs and wasted time due to reproduction are reduced, and the stability of product quality is ensured. Furthermore, the brix meter is not only suitable for analyzing the carbon content in liquid but also enables rapid detection, thereby reducing the time from sampling to obtaining the test results. The time reduction leads to the minimization of the decrease in carbon content due to the oxidation and decomposition of the carbon source. Additionally, by using the flocculant to clarify the sample, the accuracy of the carbon content analysis performed by the Brix meter is further improved.

Finally, as shown in the step S5, the third slurry is dried and sintered to form the carbon-coated lithium iron phosphate material. The carbon-coated lithium iron phosphate material includes a core layer and a carbon coating layer. The core layer is formed from the lithium source, the iron source, and the phosphorus source. The carbon coating layer is formed from the first carbon source and the second carbon source. Preferably but not exclusively, the third slurry is dried by a spray drying method, and is sintered at a temperature ranged from 550° C. and 750° C. in a non-oxidizing atmosphere for a duration from 7 to 15 hours to form the carbon-coated lithium iron phosphate material. The carbon-coated lithium iron phosphate material has a carbon content percentage ranged from 1.0% to 1.6%. Certainly, the drying method, the sintering conditions, and the carbon content percentage of the carbon-coated lithium iron phosphate material are not limited thereto, and are adjustable according to the specific requirements or needs.

The manufacturing method and the effects of the present disclosure are further described in detail below through the demonstrative example.

Demonstrative Example

First, a first slurry, a first carbon source and a lithium source are provided. 5585 grams of iron powder, 11529 grams of 85% phosphoric acid solution, and 40 liters of deionized water are reacted in a tank for a duration of 20 hours to form the first slurry. In the demonstrative example, target specifications include a desired weight of 1578 grams and a carbon content percentage of 1.4% for the carbon-coated lithium iron phosphate material. A target value is 50% of the input value. Based on the provided data and calculations, the target value of 22.1 grams, the input value of 44.2 grams and a first weight of 44.2 grams is obtained.

The first carbon source is a glucose, where carbon atoms account for 40% of its molecular mass. Consequently, 110.5 grams of glucose is required to achieve the first weight of 44.2 grams. The lithium source is 1197 grams of lithium hydroxide (LiOH) and 1847 grams of lithium carbonate ($Li_2CO_3$). The 5585 grams of iron powder contains 100 moles of iron, while the 11529 grams of 85% phosphoric acid solution contains 100 moles of phosphorus. The combination of the 1197 grams of lithium hydroxide and the 1847 grams of lithium carbonate contains 100 moles of lithium. These components are used to produce 100 moles of lithium iron phosphate ($LiFePO_4$).

Next, the 110.5 grams of glucose, the 1197 grams of lithium hydroxide (LiOH), the 1847 grams of lithium carbonate ($Li_2CO_3$), and the first slurry are mixed, reacted and ground to form a second slurry. The glucose, the lithium hydroxide (LiOH), the lithium carbonate ($Li_2CO_3$), and the first slurry are ground by a ball milling method to form the second slurry. The second slurry has a median particle size (D50) of 1.0 μm.

After that, a sample is obtained by sampling the second slurry. The sample is clarified with a flocculant, and then the clarified sample is analyzed by a Brix meter. A Brix value of 5.10° Bx is obtained by the Brix meter. By applying the regression line equation (1) and substituting the obtained Brix value of 5.10° Bx, a predicted carbon content percentage of 1.16% is calculated for the lithium iron phosphate material formed from the second slurry material. Additionally, by calculating the desired weight of the carbon-coated lithium iron phosphate material (1578 grams) and the percentage of the target value relative to the input value (50%), the weight of carbon contained in the second slurry of 36.6 grams is obtained. Subtracting the weight of carbon contained in the second slurry material (36.6 grams) from the input value of 44.2 grams, the loss value of 7.6 grams is obtained.

Subsequently, a second carbon source is added into the second slurry to form a third slurry. The second carbon source a second weight, and the second weight equals to the loss value of 7.6 grams. In the demonstrative example, the second carbon source is a glucose, where carbon atoms account for 40% of its molecular mass. Consequently, 19 grams of glucose is required to achieve the first weight of 7.6 grams. Preferably but not exclusively, the 19 grams of glucose is added into the second slurry in a form of a glucose solution to facilitate faster and easier mixing. The glucose solution is prepared with the deionized water.

Finally, the third slurry is dried and sintered to form the carbon-coated lithium iron phosphate material. The third slurry is dried by a spray drying method, and is sintered at a temperature ranged from 550° C. and 750° C. in a nitrogen atmosphere for a duration of 10 hours to form the carbon-coated lithium iron phosphate material. Performing an elemental analysis on the carbon-coated lithium iron phosphate material by an elemental analyzer, and a carbon content percentage of 1.4% is obtained. The carbon content percentage of 1.4% matches the predicted carbon content percentage.

In summary, the present disclosure provides a manufacturing method of a carbon-coated lithium iron phosphate material including rapid carbon content detection in a slurry, thereby reducing the costs and the wasted time and further ensuring the stability of the product quality. First, a first slurry, a first carbon source and a lithium source are mixed to form a second slurry. The first slurry is formed from a metal source and a phosphorus source. The first carbon source is a water-soluble carbohydrate having a first weight. The first weight equals to an input value. Next, a sample is taken from the second slurry, and a carbon content analysis is performed on the sample to obtain a loss value. The carbon content analysis is performed by a brix meter. After that, a second carbon source is added into the second slurry to form a third slurry. The second carbon source is a water-soluble carbohydrate having a second weight. The second weight equals to the loss value. Finally, the third slurry is dried and sintered to form the carbon-coated lithium iron phosphate material. Performing the carbon content analysis on the slurry before drying and sintering provides the feasibility to add the second carbon source based on the obtained loss value, particularly when the target specification of the carbon content is not met. As a result, the additional costs and the wasted time due to reproduction are reduced, and the stability of product quality is ensured. Compared to the traditional carbon content analysis through combustion, the brix meter is not only suitable for analyzing the carbon content in liquid but also enables rapid detection, thereby reducing the time from sampling to obtaining the test results. The time reduction leads to the minimization of the decrease in carbon content due to the oxidation and decomposition of the carbon source.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A manufacturing method of a carbon-coated lithium iron phosphate material, comprising steps of:
   (a) providing a first slurry, a lithium source, and a first carbon source having a first weight, wherein the first slurry is formed from an iron source and a phosphorus source, wherein the lithium source, the iron source and the phosphorus source are configured to form a core layer of the carbon-coated lithium iron phosphate material, and the first weight is equal to an input value;
   (b) mixing and grinding the first carbon source, the lithium source and the first slurry to form a second slurry;
   (c) performing a carbon content analysis on the second slurry to obtain a loss value, wherein the loss value is smaller than the input value and greater than zero, and the carbon content analysis is performed by a brix meter;
   (d) adding a second carbon source having a second weight into the second slurry to form a third slurry, wherein the second weight is equal to the loss value; and
   (e) drying and sintering the third slurry to form the carbon-coated lithium iron phosphate material, wherein the carbon-coated lithium iron phosphate material comprises the core layer and a carbon coating layer coated on the core layer, wherein the core layer is formed from the lithium source, the iron source and the phosphorus source, and the carbon coating layer is formed from the first carbon source and the second carbon source.

2. The manufacturing method of the carbon-coated lithium iron phosphate material according to claim 1, wherein the first carbon includes a water-soluble carbohydrate.

3. The manufacturing method of the carbon-coated lithium iron phosphate material according to claim 2, wherein the carbon content analysis is performed on a sample to obtain the loss value, and the sample is taken from the second slurry.

4. The manufacturing method of the carbon-coated lithium iron phosphate material according to claim 3, wherein the sample comprises a flocculant.

5. The manufacturing method of the carbon-coated lithium iron phosphate material according to claim 1, wherein the carbon source, the lithium source and the first slurry are ground by a ball milling method.

6. The manufacturing method of the carbon-coated lithium iron phosphate material according to claim 1, wherein the third slurry is dried by a spray drying method.

7. The manufacturing method of the carbon-coated lithium iron phosphate material according to claim 1, wherein the third slurry is sintered in a non-oxidizing atmosphere.

8. The manufacturing method of the carbon-coated lithium iron phosphate material according to claim 1, wherein the third slurry is sintered at a sintering temperature ranged from 550° C. to 750° C.

9. The manufacturing method of the carbon-coated lithium iron phosphate material according to claim 1, wherein the carbon-coated lithium iron phosphate material has a third weight and a carbon content percentage, wherein a target value is divided by the third weight to obtain the carbon content percentage, and the target value falls between 40% of the input value and 70% of the input value.

10. The manufacturing method of the carbon-coated lithium iron phosphate material according to claim 9, wherein the carbon content percentage is ranged from 1.0% to 1.6%.

11. The manufacturing method of the carbon-coated lithium iron phosphate material according to claim 1, wherein the loss value is less than or equal to 30% of the input value.

* * * * *